Nov. 3, 1970  D. TRUFANOFF  3,537,771
VIEWING SYSTEM EMPLOYING A FRESNEL LENS
Filed Dec. 7, 1967

INVENTOR.
DORIC TRUFANOFF
BY
OSTROLENK, FABER, GERB & SOFFEN
ATTORNEYS

3,537,771
VIEWING SYSTEM EMPLOYING A FRESNEL LENS
Doric Trufanoff, North Massapequa, N.Y., assignor to Kollsman Instrument Corporation, Syosset, N.Y., a corporation of New York
Filed Dec. 7, 1967, Ser. No. 688,927
Int. Cl. G02b 3/08, 23/08
U.S. Cl. 350—52           1 Claim

ABSTRACT OF THE DISCLOSURE

A Fresnel type plastic lens is combined with an optical system to provide a lightweight viewing system which produces a virtual image of unity magnification and with a stereoscopic or three-dimensional viewing.

---

This invention relates to viewing systems, and is more particularly concerned with the application of Fresnel type plastic lenses to optical systems to provide a viewing system especially suitable in situations where the viewer cannot look directly out of a viewing port.

In many situations, it is difficult if not impossible to provide the occupant of an enclosure with a viewing port for directly viewing the outside world. Thus, in many high performance aircraft, like supersonic transports, earth satellites, space crafts, etc.; it becomes necessary to provide the occupant with a viewing system by which he can observe the environment outside his enclosure. The design of such a viewing system is not as simple as it may seem at first blush, and indeed has plagued engineers for many years.

Thus, of immediate concern, are the optical characteristics of any proposed viewing system. This problem is especially acute with today's high speed craft wherein a pilot traveling at many, many times the speed of sound has a "split second" within which to make a decision which will influence the craft's course for miles to come. Thus, it is crucial that the optical characteristics of any proposed viewing system present the pilot with a view which is as accurate as possible. Hence, it is desirable to provide a system producing a virtual image, having unity magnifications, depth perception, resolution, and clarity equivalent to viewing the outside world through an ordinary glass port.

As noted above, the criticality of these optical requirements is especially acute with today's high performance craft and is to be contrasted with the optical characteristics which are to be tolerated in viewing systems used in a slower craft, like submarines, where the commander has a much greater time within which to make a decision upon first noticing a potentially dangerous situation.

A second requirement for any proposed viewing system, is that the system must allow the occupant of the craft a degree of freedom which permits him to carry on other activities. Thus, in viewing systems presently in use, such as a periscope, it is required that the occupant of the craft maintain his eye or eyes up against a binocular or monocular optical system. This is highly unsatisfactory, since the user must alternate his gaze between the viewing system and the other objects in his craft which require his attention.

Finally, superimposed upon and compounding the above described problems is the ever existing problem of weight reduction. Thus, as well appreciated, fuel consumption, payload, etc. all depend upon the weight of the vehicle which, in turn, is dependent upon the aggregate sum of the weight of the individual components of the craft, which include any proposed viewing system.

Thus, engineers have struggled with all of these problems in an attempt to come up with a viewing system to be used when direct access viewing is impossible, which viewing system will have excellent, almost real-life optical characteristics; will permit freedom within the craft; and at the same time be lightweight. However, and despite the many years during which the need for such a system has been apparent, no such system satisfying all the above described requirements has ever been produced. As noted above, prior art systems have solved some of the problems but has not, prior to the instant invention, reached a state whereby all the desired characteristics are combined in one system.

Thus good optical characteristics can be achieved with standard refractive glass systems; but in order to keep weight down, the system must be small. This in turn requires the user to keep his eyes close to the system thereby prohibiting any satisfactory degree of head movement.

As an alternate approach, engineers have considered using a large enough refractive glass optics system to permit the viewer to stand away from the viewing surface and also be allowed to move his head within a prescribed radius. However, such a system has never been implemented because of the high cost and tremendous weight (in the order of hundreds of pounds) of the hemispherical glass lens components necessary to achieve the required optics.

In contradistinction, the instant invention does in fact solve all of the described problems, and results in a viewing system having the necessary optical characteristics to provide a view of the outside world which is virtual image, of 1–1 magnification and stereoscopic, while at the same time possess excellent depth perception, resolution and clarity. Simultaneously, the instant invention makes possible, for the user, a degree of freedom which has been unknown in quality optic systems of the type with which the instant invention is concerned. Thus, in one illustrative embodiment of the instant invention, a viewer can stand back approximately fifty inches from a screen, to be described in greater detail; move his head and eyes within a range of approximately six to seven inches in diameter; and yet be presented with a view of the outside world of such a nature that it gives the impression of looking through a simple glass window.

Finally, the above described superb optical characteristics and unheard degree of freedom, is made possible in a system which is of such lightweight as to be comparatively negligible in the overall weight of the craft. Thus, compared to a hemispherical piece of glass in the order of hundreds of pounds which would have been necessary to achieve the same results, the instant invention ultilizes a viewing screen weighing in the order of a quarter of a pound. The weight, size and cost reduction is apparent.

The instant invention makes possible the simple and inexpensive solution to these interrelated problems by drawing upon elements which for years have been available in the prior art but never combined and applied in the manner suggested by the instant invention. Specifically the invention may be broadly characterized as applying Fresnel lens technology to a large viewing system so designed as to present virtual image, 1–1 magnification, stereoscopic viewing to a viewer who is relatively far away and relatively free to perform other functions.

In one embodiment of the instant invention, a lens system utilizing glass refractive optics designed to gather a view of the outside world, is inserted in a relatively small aperture in the shell of the vehicle within which the viewing system is being utilized. Located behind the lens system by a distance dependent only upon the particular system design is a relatively large fresnel lens, the rear surface of which receives the image projected by the lens system. The result is of such excellent optical character, and of such size, that it appears to the casual observer that he is looking through a pane of glass. Furthermore, the weight of the Fresnel lens is negligible compared to the overall craft.

In an alternative embodiment of the instant invention, fresnel lens technology is further applied to the lens system which initially gathers the view of the outside world and passes it on to the rear of the fresnel viewing screen. Specifically, rather than using hemispherical glass lenses as field lenses within the "up front" optics system, the instant invention proposes to utilize fresnel type field lenses which are lightweight, low cost, and at the same time are easily movable in the longitudinal direction to preselectively vary the magnification of the entire system.

In still another embodiment of the instant invention, a beam splitter is interposed between the "up front" lens system which gathers the outside view, and the fresnel viewing screen. The beam splitter is oriented in such a manner as to receive the image of a second scene, such as an instrument panel, and super-impose it upon the fresnel lens which is simultaneously receiving the image of the outside world. In this manner, the observer without moving his head, can view more than one scene simultaneously.

In yet another embodiment, deviating lenses are applied to the basic system such that it may function in a periscopic manner.

Accordingly, it is an object of the instant invention to provide a viewing system having high quality optics; permits the user a relatively great degree of freedom, and at the same time is of such size and weight that it may be used for vehicles where weight is of prime importance.

Another object of the instant invention is to provide a viewing system employing fresnel type plastic lenses whereby a virtual image is produced having 1–1 magnification and stereoscopic or three-dimensional effect.

Another object of the instant invention is to provide such a viewing system whereby the person need not keep his head up to the viewing screen.

It is another object of the instant invention to provide a viewing system whereby the pilot of an aircraft may observe the outside scene and at the same time observe another scene such as his control panel.

Another object of the instant invention is to provide a viewing system having wide angle capabilities.

Another object of the instant invention is to provide such a viewing system whereby the magnification of the view may be selectively varied.

Another object of the instant invention is to provide a viewing system whereby the viewing distance from the viewer to the viewing system may be conveniently varied.

Other objects and a better understanding of the instant invention may be had by referring to the following description and drawings, in which.

Figure 1:
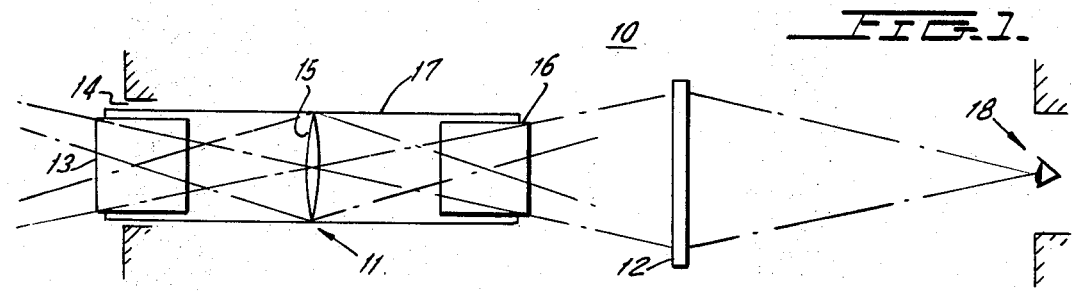
FIG. 1 shows an optical schematic of one embodiment of the instant invention.
Figure 4:
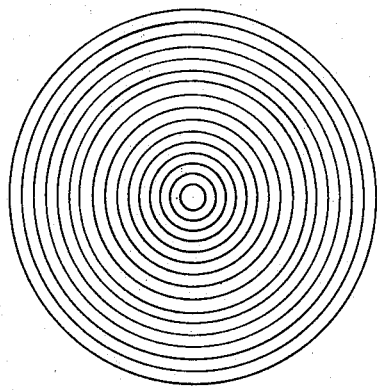
FIG. 4 is a view of a typical fresnel lens which may be used in the practice of the instant invention.

Referring to FIG. 1, there is shown an optical schematic of a viewing system of the instant invention generally identified as 10. The system consists of a lens system 11 designed to gather the outside view and project it onto the rear of a fresnel lens 12 of such dimension as to appear almost like a screen. A typical fresnel lens which may be employed in the instant invention is shown in FIG. 4 and, as well known in the art, would generally comprise a plastic material having concentric lenticular rings and exhibiting the optical characteristics of a large hemispherical glass. It is noted that while the fresnel lens shown has concentric lenticular rings, other fresnel type lenses of differing design are presently available and may be employed in the instant invention with equal success. The importance of utilizing a fresnel lens lies not in the specific construction chosen, but in the general characteristics of all fresnel lenses, i.e., excellent optical characteristics and lightweight. For instance, for a system like that shown in FIG. 1, a specific Fresnel lens utilized was of approximately 20" diameter. This lens weighed only one quarter pound but simulated the optical characteristic of a piece of hemispherical glass weighing in the order of 300 pounds.

It is also to be understood that while the viewing system of the instant invention has been described with respect to environments such as high performance aircraft, supersonic transports, aerial satellites, spacecraft, etc., it has various other applications such as in data displays, and any other environment where it is desirable to provide a virtual image view, and especially in the situation where direct access viewing is either impractical or impossible.

A lens system 11 which has been found particularly satisfactory in the practice of the instant invention includes an objective lens 13 situated in a small aperture 14 of the aircraft or other enclosure in which the system is being utilized. The objective lens collects the field rays of the view to be seen. The aperture 14 may be typically in the order of six to eight inches in diameter and the objective lens 13 of such thickness and strength so as to withstand the high speed, high temperature environment wherein such systems find primary application. The lens system 11 further includes a field lens 15 of biconvex glass and a relay lens 16.

The objective lens 13, the field lens 15, and the relay lens 16, are enclosed in a tube 17 and spaced from the Fresnel lens 12 at a distance dictated by the particular system.

Optically, the lenses in the tube 17 are spaced such that the objective lens 13 collects the field rays of the view to be seen and produces a real image in its primary focal plane. The field lens 15 is located in the primary focal plane of the objective lens and acts to converge the off-axis diverging rays from the objective lens. The relay lens is then situated so that these rays converge at the pupil of the relay lens whereby the relay lens then serves to produce an enlarged aerial image of the primary focal plane at a point where the fresnel lens 12 is located.

The Fresnel lens or viewing screen 12 is positioned so that it will reproduce the exit pupil of the relay lens 16 at a point where the observer's eyes are located. The observer may situate himself anywhere within the aerial port 17 of the Fresnel lens 12 and look straight out at the real world through the Fresnel window 12 while at the same time realizing unity magnification, depth perception, resolution and clarity virtually equivalent to viewing the outside world through an ordinary glass window of the same dimensions as the Fresnel window 12.

As an example of the degree of freedom which the instant invention makes possible, it may be pointed out by way of example that for a system such as that shown in FIG. 1, wherein the Fresnel lens 12 is in the order of 24" in diameter, the observer can be situated behind the Fresnel lens by as much as 50", move his eyes within an exit pupil 18 of approximately 8" is diameter and yet clearly view the highly accurate, stereoscopic, unity-magnification, virtual image on the Fresnel lens 12.

Figure 2:
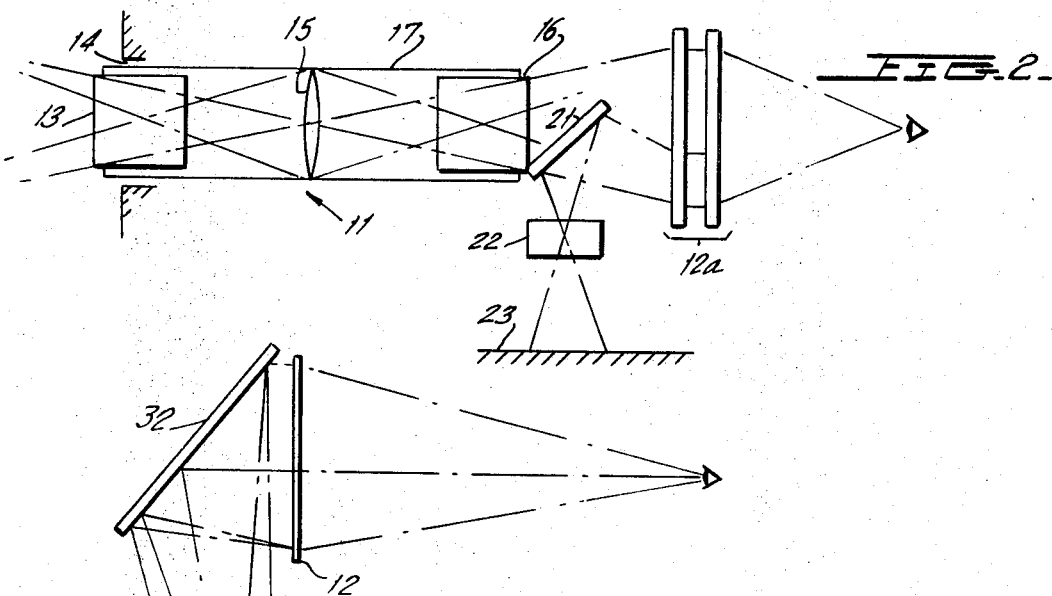
FIG. 2 is an optical schematic of an alternative embodiment of the instant invention employing both "beam splitting" and a tandem fresnel lens arrangement.

FIG. 2 is a modification of the optical system of FIG. 1, with like elements being given like numerals. In the optical systems of FIG. 2, the Fresnel window has been modified to include a pair of Fresnel lenses 12a maintained in tandem fashion. The lenses may be separated by a short distance, or, as well known in the art, may be in contact with one another. The use of a tandem arrangement of two Fresnel lenses 12a materially shortens the viewing distance relative to a single Fresnel lens system such as that shown in FIG. 1. As an example, it may be stated that a typical system employing one Fresnel lens in FIG. 1 might require a viewing distance (distance from the eye 18 to the lens 12) of approximately 50", while the tandem arrangement of FIG. 2 makes possible a reduction in the viewing distance by approximately one-half. Thus with the same optical system, the viewing distance for the embodiment of FIG. 2 is approximately 25".

A second distinction between the system of FIG. 2 and that of FIG. 1 is that FIG. 2 includes a beam splitter 21 which may be composed of plain glass or other appropriate material. The beam splitter is interposed between the tube 17 and the Fresnel lens (may be the single lens 12 of FIG. 1 or the tandem arrangement 12a of FIG. 2) and is combined with a projecting lens 22 to project the image of a control panel 23 or other scene upon the rear of the Fresnel lens. Simultaneously the beam splitter 21 permits the view of the outside world collected from the lens system 11 to be passed therethrough such that the end result is a dual, superimposed image upon the Fresnel lens system of the outside world and the control panel.

Figure 3:
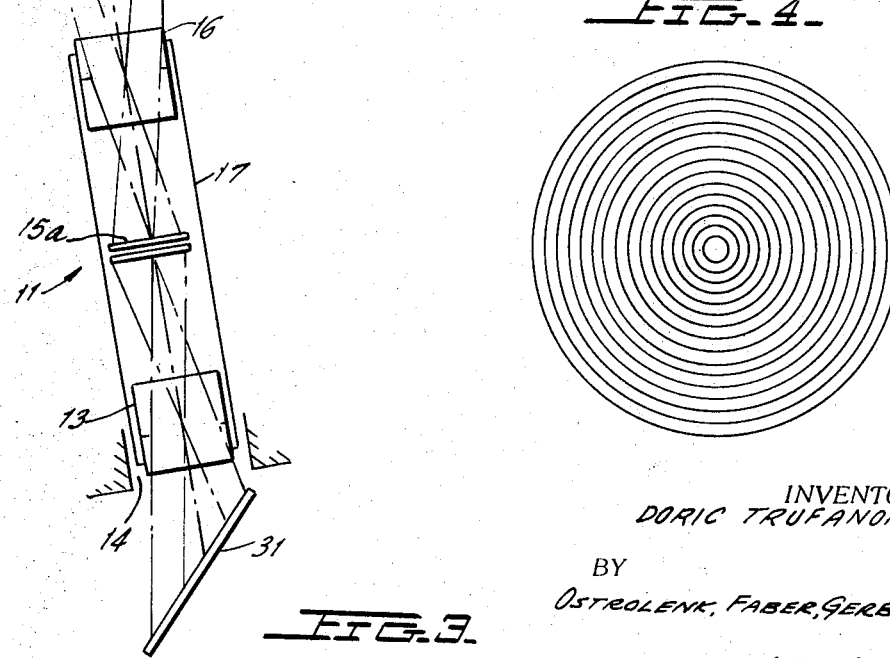
FIG. 3 is an optical schematic of the instant invention employing an alternative embodiment for the view gathering lens system portion thereof, and further modified to function in a periscopic mode of operation.

FIG. 3 is another modification of the viewing system of FIG. 1 adapted for periscopic viewing. The common elements of the systems of FIGS. 1 and 3 and correspondingly numbered. In the viewing system of FIG. 3, a deviating mirror 31 is provided for collecting the field rays and propagating them to their objective lens 13. The rays then pass through the lens system 11 and are then reflected by a second deviating mirror 32 to the Fresnel window 12. The Fresnel window is positioned such that it reproduces the exit pupil of the relay lens 16 at an exit port within which the observer's eyes would be located.

The embodiment of FIG. 3 illustrates another particularly advantageous feature of the instant invention Specifically in place of the standard hemispherical glass field lens 15, the embodiment of FIG. 3 utilizes a tandem arrangement of Fresnel field lenses 15a which, of course, have the lightweight, low cost advantages inherent in the application of Fresnel lenses in the instant invention. Furthermore, the use of Fresnel lenses as field lenses in the tube 17 with their attendant lightweight advantages, makes it relatively simple to move the field lenses longitudinally within the tube 17. Such translation, according to the needs of the user, varies the magnification ratio from the 1–1 relationship which would be achieved were the Fresnel lenses positioned as shown in FIG. 3. When glass hemispherical field lenses such as 15 in FIGS. 1 and 2 are utilized, it is relatively cumbersome to effectuate such translation within the tube 17. Of course, it will be appreciated that the periscopic arrangement of FIG. 3 can be practiced without using Fresnel field lenses, and similarly the Fresnel field lenses (either one or a tandem arrangement) can be employed in other than periscopic systems. Similarly, the beam splitter arrangement shown FIG. 2 can be employed with the periscopic system of FIG. 3.

Regardless of the system utilized, the embodiments of FIGS. 1, 2 and 3 all achieve the high optical requirements dictated by today's high performance aircraft. Thus each system provides a wide angle virtual image stereoscopic, or three-dimensional, view with 1–1 magnification (as noted above, with the embodiment of FIG. 3 the magnification ratio may be easily varied by movement of the field lens. In addition, the viewer is permitted a great degree of freedom of movement of his head while continuing to view the outside world. This is to be contrasted to the prior art systems wherein the observer must keep his head up to the instrument. All of the above results are accomplished by a simple and inexpensive, lightweight viewing system of minimum size.

It should be further noted that the viewing systems described have an actual brightness efficiency somewhere in the order of 80–90%. That is, very little of the outside light is blocked out by the system elements. However, since the observer is usually in a darkened environment, his pupils are generally wide open. This phenomenon gives the observer the impression that the viewing system is actually operating at 100% efficiency, such that a viewer receives the impression that he is looking through a piece of plain window glass directly at the outside world.

What is claimed is:
1. In combination, means including objective lens means having a clear aperture on the order of about 6 to 8 inches having a direct line-of-sight to a real world scene and forming at its focal plane a first real image of said scene, means optically aligned with said objective lens including a field lens and a relay lens for forming an enlarged real image of said first real image at its image plane, and means mounting a Fresnel type field lens means in said image plane for forming a real image of said relay lens that defines an exit pupil having a diameter on the order of about 6 to 8 inches whereby an observer having both eyes at said exit pupil observes a substantially one-to-one magnified view of said scene, said view being characterized by resolution and depth perception substantially equivalent to direct viewing of said scene.

References Cited

UNITED STATES PATENTS

| | | | |
|---|---|---|---|
| 1,505,878 | 8/1924 | Erfle | 350—45 X |
| 2,589,014 | 3/1952 | McLeod | 350—211 |
| 2,952,180 | 9/1960 | Estes | 350—211 X |
| 2,963,942 | 12/1960 | Montremy | 350—45 X |
| 3,003,387 | 10/1961 | Schiele | 350—9 X |
| 3,171,879 | 3/1965 | Gruber et al. | 350—45 |

FOREIGN PATENTS 1,344,385  10/1963  France.

OTHER REFERENCES

Miller et al.: "Thin Sheet Plastic Fresnel Lenses of High Aperture," J.O.S.A. vol. 41, No. 11, November 1951, pp. 807–815.

PAUL R. GILLIAM, Primary Examiner

U.S. Cl. X.R.

350—211